Oct. 29, 1929.  E. J. RAY  1,733,200
MACHINE FOR OPERATING ON HEELS
Filed Feb. 23, 1922   8 Sheets-Sheet 1

INVENTOR
Eugene J. Ray
By his Attorney
Nelson W. Howard

Oct. 29, 1929.　　　E. J. RAY　　　1,733,200
MACHINE FOR OPERATING ON HEELS
Filed Feb. 23, 1922　　8 Sheets-Sheet 2

INVENTOR
Eugene J. Ray
By his Attorney
Nelson H. Howard

Oct. 29, 1929.  E. J. RAY  1,733,200
MACHINE FOR OPERATING ON HEELS
Filed Feb. 23, 1922   8 Sheets-Sheet 3

Oct. 29, 1929.  E. J. RAY  1,733,200
MACHINE FOR OPERATING ON HEELS
Filed Feb. 23, 1922   8 Sheets-Sheet 4

INVENTOR
Eugene J. Ray
By his Attorney
Nelson W. Howard

Oct. 29, 1929.   E. J. RAY   1,733,200
MACHINE FOR OPERATING ON HEELS
Filed Feb. 23, 1922   8 Sheets-Sheet 6
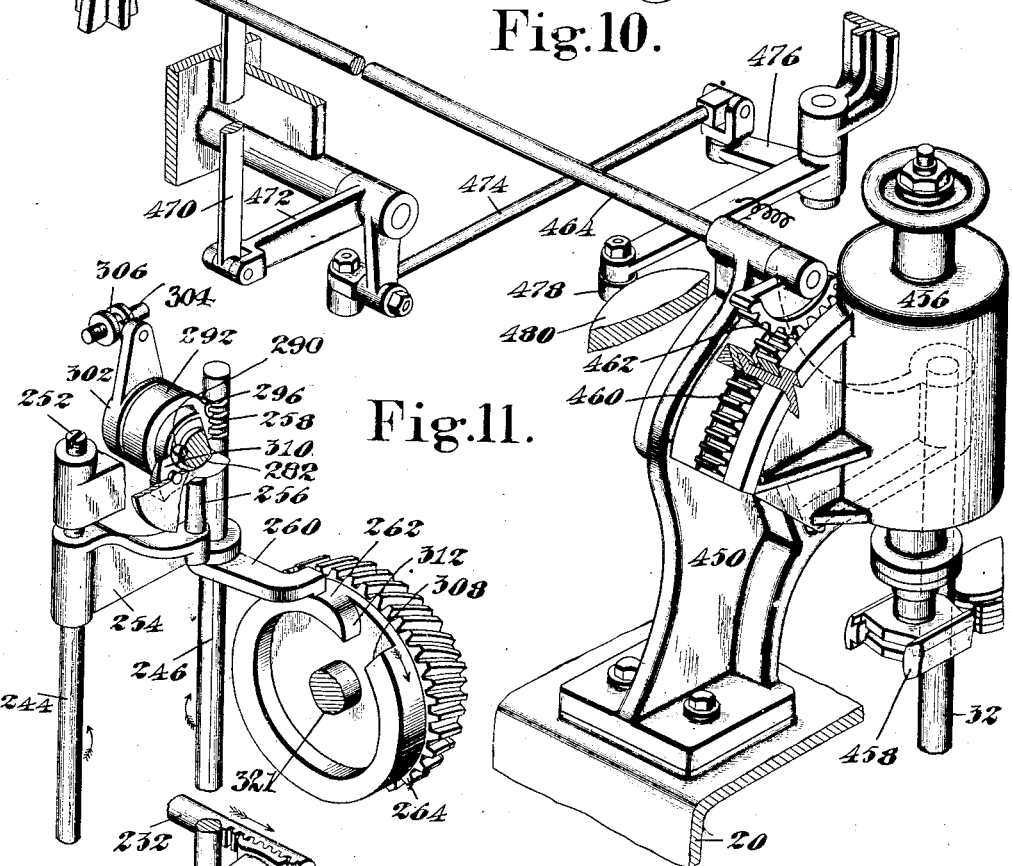

Oct. 29, 1929. E. J. RAY 1,733,200
MACHINE FOR OPERATING ON HEELS
Filed Feb. 23, 1922 8 Sheets-Sheet 7
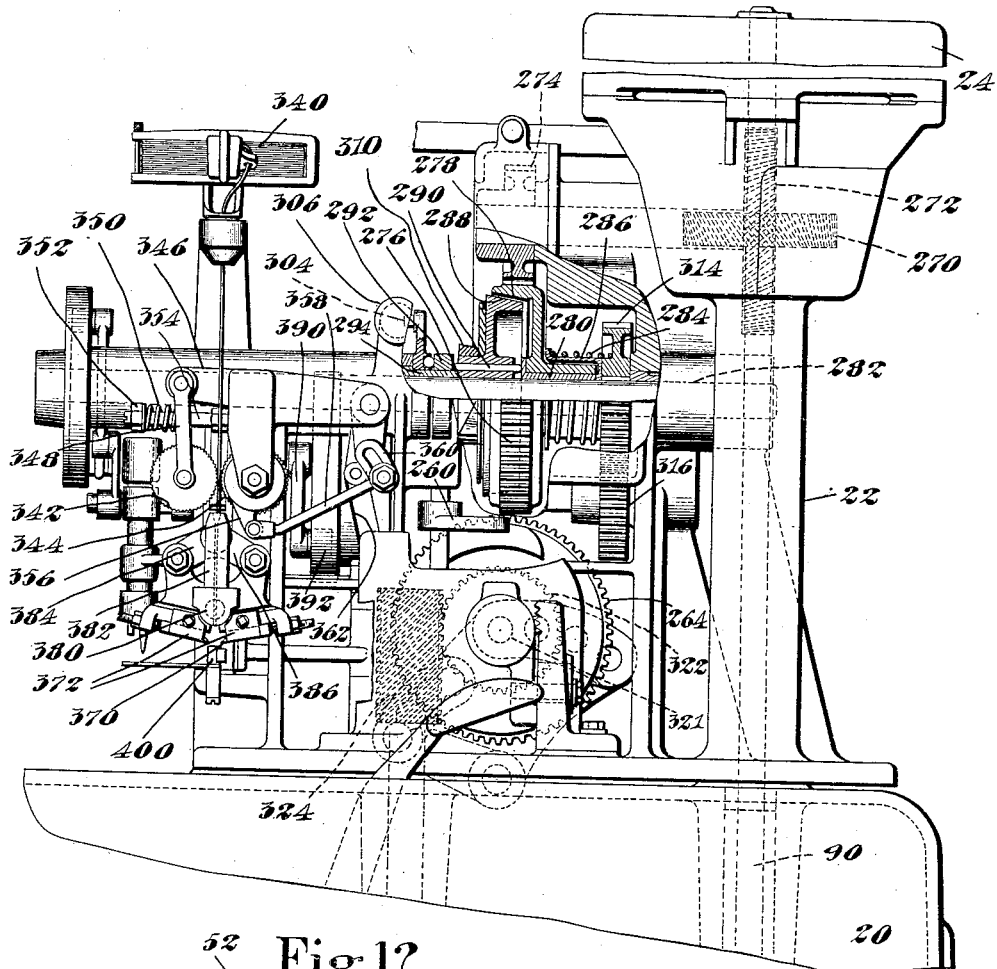
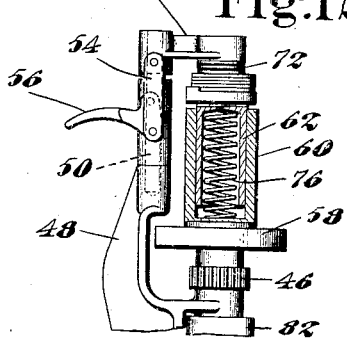
Fig. 14.
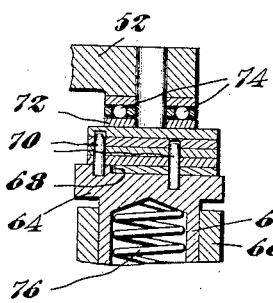
Fig. 15.
INVENTOR
Eugene J. Ray
By his Attorney

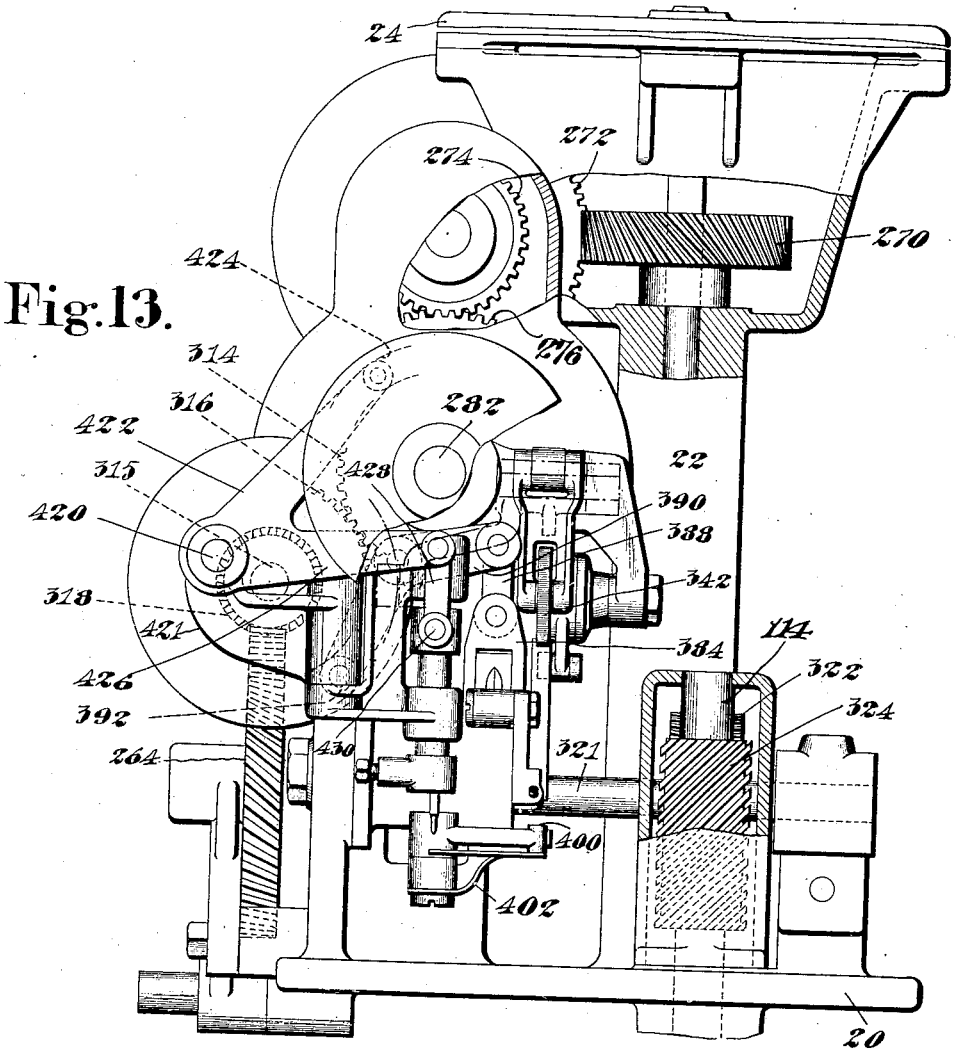
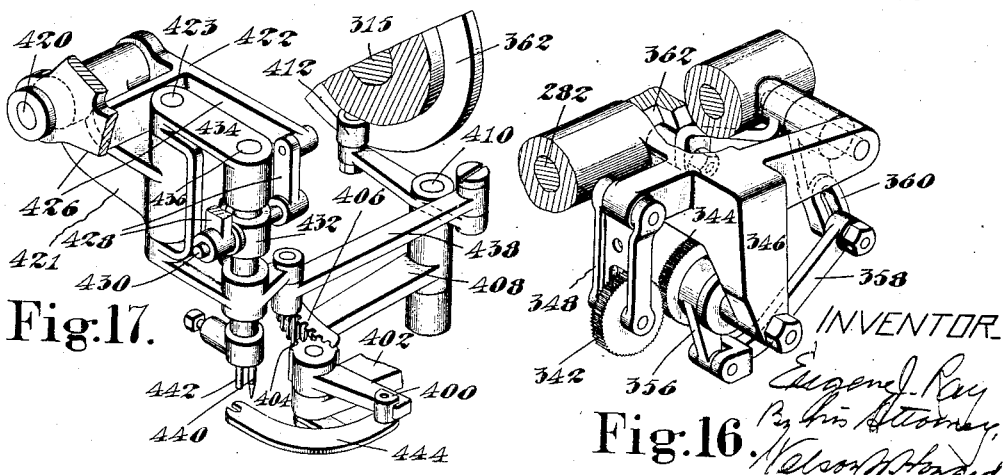

Patented Oct. 29, 1929

1,733,200

UNITED STATES PATENT OFFICE

EUGENE J. RAY, OF BEVERLY, MASSACHUSETTS, ASSIGNOR TO UNITED SHOE MACHINERY CORPORATION OF PATERSON, NEW JERSEY, A CORPORATION OF NEW JERSEY

MACHINE FOR OPERATING ON HEELS

Application filed February 23, 1922. Serial No. 538,622.

This invention relates to machines for use in the manufacture of shoes and particularly to the positioning of and operation upon rigid shoe parts such as heels.

It is an object of the invention to provide a machine which will perform one or a series of operations upon such articles as heels with a minimum of attention on the part of the operative and with a maximum assurance of uniformity in the output. With this in view the invention relates particularly to an organization arranged to position the work and to insure accuracy of control during its presentation to the operating instrumentalities, the invention being shown and described as embodied in a machine provided with positioning surfaces such as jig pins arranged to co-operate with corresponding positioning surfaces such as jig holes formed in the work prior to its presentation to the jig pins to position the work and to insure the control thereof during the performance of one or more operations thereon.

More specifically, the illustrated machine is provided with a series of heel holders or clamps carried by a conveyor and by which the heels are carried to different operating stations, each heel holder being provided with a pair of jig pins arranged to co-operate with corresponding jig holes previously formed in the heels to control the position of the heels as they are operated upon. The conveyor of the illustrated machine is arranged to present the heels successively to slugging mechanism and to a trimming tool. While at the slugging and trimming stations the heel clamps and the heels therein are rotated to present the different parts of the periphery of the tread surfaces of the heels to the slugging mechanism for the insertion of a row of fastenings and to present the contour surfaces of the heels to the trimming cutter. Each clamp is provided with a templet corresponding to the desired form of the finished heel. As the heel clamps rotate the templets move them laterally of the operating tools thus causing the heels to move in a path corresponding to their contour.

With the above and other objects in view the invention will now be described in connection with the accompanying drawings and pointed out in the claims. It should be borne in mind, however, that the machine of these drawings is merely illustrative of one form in which the invention may be embodied and that the scope of the invention is such as to include other forms and modifications. Accordingly the claims should be given as broad a construction as their language and the state of the prior art will warrant. It should be noted, moreover, that various of the features of the heel trimming mechanism are not claimed herein since they form the subject matter of my co-pending application, Serial Number 324,441, filed 7 December, 1928, as a division of this application.

In the drawings,

Fig. 8 is a view of a portion of the mechanism by which the operation of fastening inserting and triming means is timed with respect to the stopping and starting of the conveyor.

Fig. 9 is a detail of a stop mechanism included in Fig. 8;

Fig. 10 is an exploded view of a clutch controlling mechanism also included in Fig. 8;

Fig. 11 illustrates means arranged to control the axis about which the trimming tool rotates;

Figs. 12 and 13 are front and side elevations respectively of the fastening inserting means and parts associated therewith;

Fig. 14 is a side elevation partly in section of one of a series of heel holding clamps carried by the conveyor;

Fig. 15 is a longitudinal section of portions of the clamp of Fig. 14 illustrating the manner in which jig pins may be utilized to position a heel in the clamp;

Figs. 16 and 17 are perspective views of feed rolls operative to present wire to the fastening severing cutters of the machine and of fastening inserting means respectively.

The illustrated machine is of a type provided with a conveyor which carries the work from a feeding station to one or more operating stations. In the present instance the conveyor is in the form of a rotating turret provided with a series of clamps arranged to clamp partially completed heels or heel blanks and to present them to a slug inserting station and to a trimming station where they are respectively slugged and trimmed by appropriate mechanism.

Figure 3:
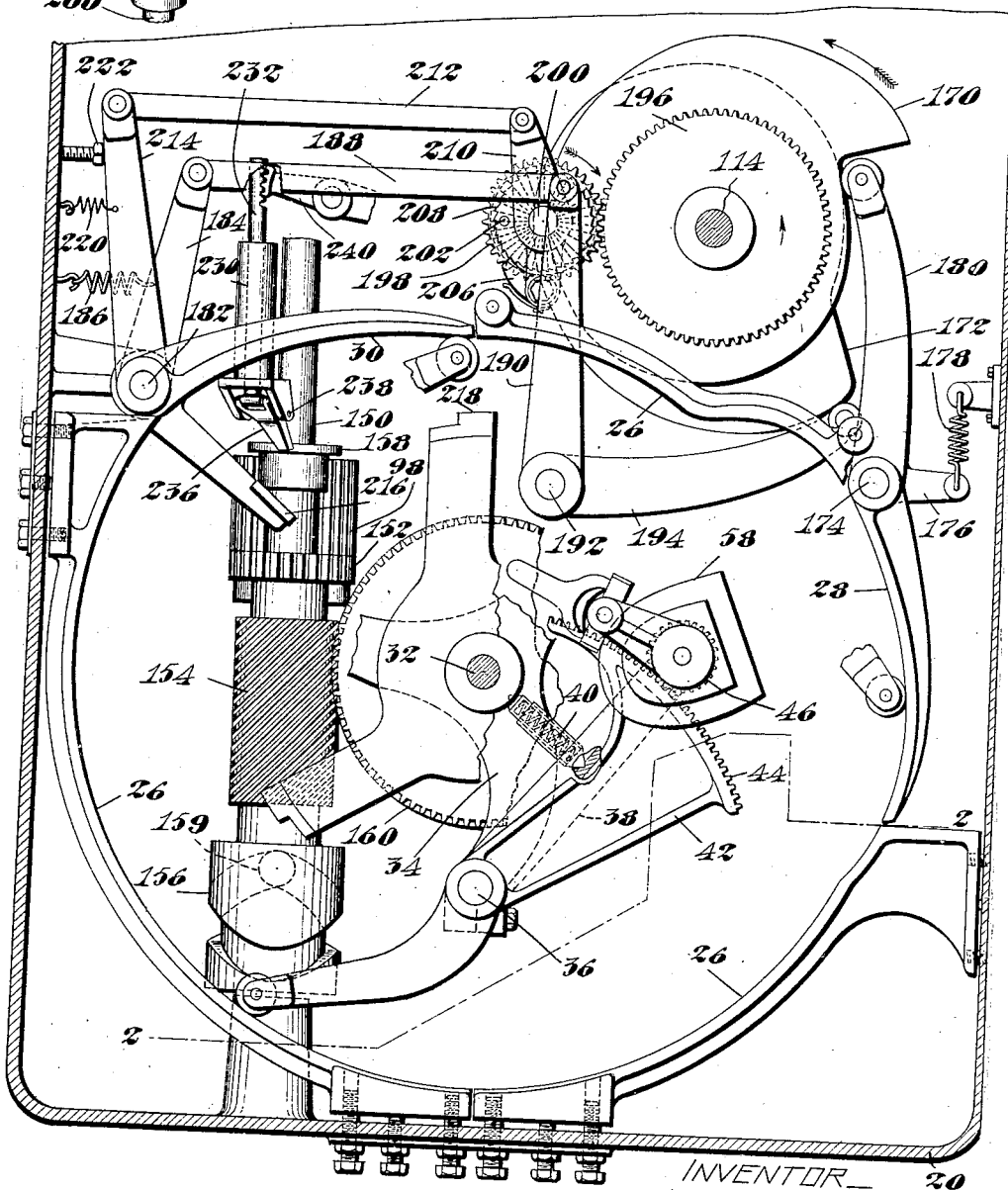
Figs. 3 and 4 are plan views, each partly broken away, of conveyor mechanism which presents the work to the operating stations of the machine.
Figure 4:
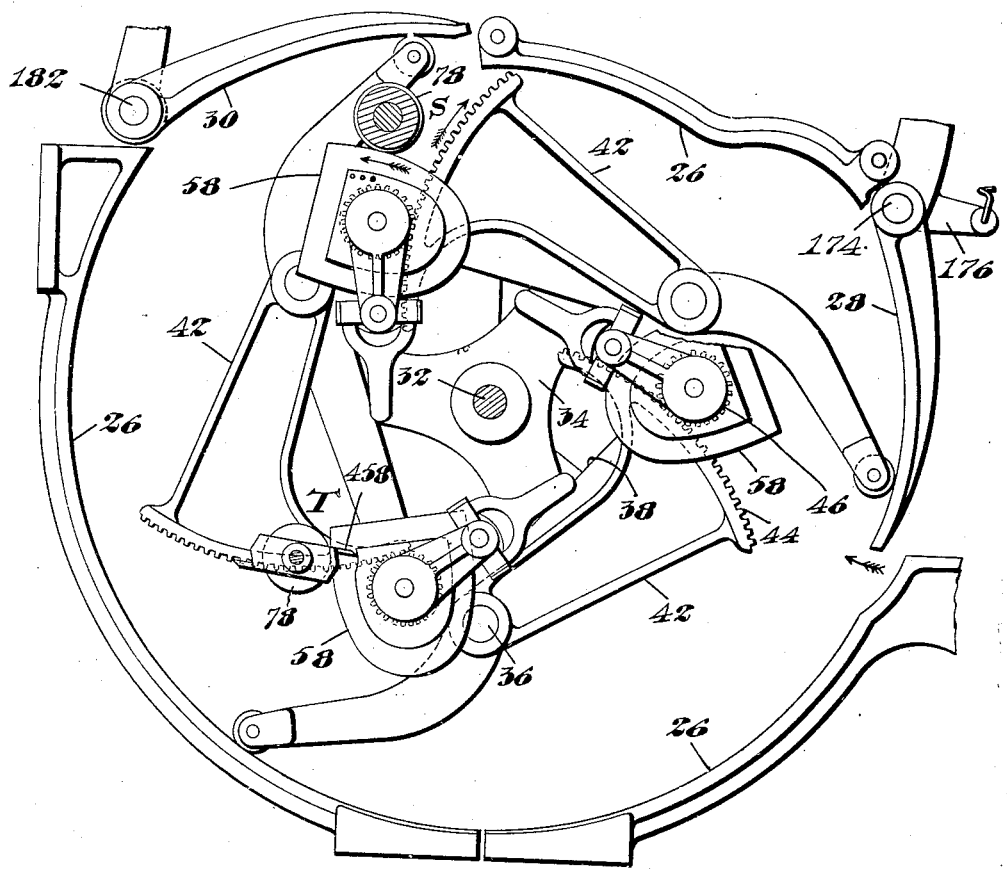

The machine is provided with a main frame 20 having upstanding parts 22 arranged to carry a motor 24 and to support and provide bearings for fastening inserting and trimming means. Frame 20 is open at the top and carries a series of stationary cam track members 26 and movable cam track members 28, 30, as shown in Figs. 3 and 4. Journaled in bearings carried by the frame of the machine is an upright shaft 32 (Figs. 1, 2, 3 and 4) upon which is mounted a conveyor or turret 34 shown as provided with three work support carrying arms. Each of these arms is provided with a stud shaft 36 upon which is journaled in arm 38 provided with an enclosed spring 40 (Fig. 3) tending to rock it away from shaft 32. Each shaft 36 serves also as the fulcrum for a lever 42, one arm of which is provided with a roll cooperating with cam tracks 26, 28, 30 and the other arm of which is provided with a gear segment 44 meshing with a pinion 46 (Figs. 2, 3, 4 and 14) with which each of a series of heel clamps is provided. Each of these clamps comprises a bracket 48 formed rigid with arm 38 and carrying a rod 50 having slidably mounted upon the upper end thereof a clamping member 52. Each bracket 48 is also connected to its clamping member 52 by a toggle device 54 provided with a hand lever 56 as illustrated in Fig. 14, by means of which clamping pressure may be applied or released.

Rigid with each pinion 46 and with a shaft 57 journaled in each arm 38 is a templet 58 shaped in accordance with the desired contour of the heels being operated upon and having rigidly connected thereto a sleeve 60 in which telescopes a second sleeve 62 provided at its upper end with a work receiving or seat portion 64 the shape of which may depend upon the character of work to be handled. In the illustrated machine this part 64 is particularly adapted to receive heels which are to be used upon shoes having "short soles", that is soles which extend rearwardly only part way from the breast to the rear of the heel, and are accordingly formed each with a shoulder or break, shown in Fig. 3, and part 64 is provided with a correspondingly shaped shoulder. To control the position of the heel upon the work support, the seat portion 64 is provided with a pair of jig pins 70 arranged to co-operate with corresponding jig holes formed in the heels so as to insure the uniform positioning of the heels in the machine. Each clamp member 52 is provided with a work engaging plate 72 rotatably connected thereto as by ball bearings 74. A stiff spring 76 is housed within sleeves 60 and 62, serving to press the work firmly against plate 72 when toggle 54 is in clamping condition.

A roll 78 (Figs. 2 and 4) is provided at each operating station to co-operate with templets 58 so as to move the work in a path corresponding to the form of the templet and to the desired contour of the heels as the templet and heels are rotated by interaction of gear segments 44 and pinions 46.

Surrounding each shaft 57 is a spring 80 anchored at its upper end to a collar 82 rigidly connected to shaft 57 (Fig. 2) and at its lower end to arm 38. Thus as gear segment 44 rotates pinion 46 in one direction, the spring 80 is tensioned and will store energy to rotate pinion 46 in the opposite direction later in the operation of the machine.

Figure 7:
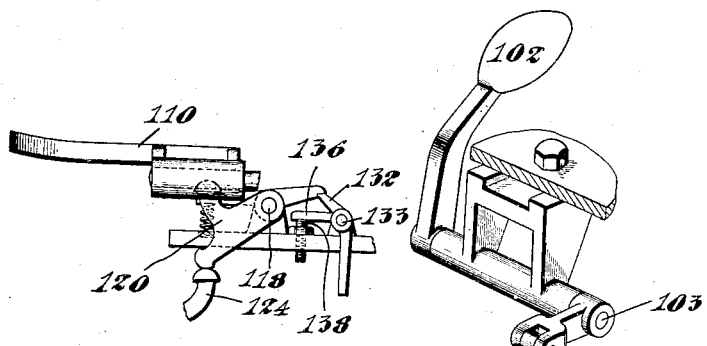
Figs. 6 and 7 show parts of the controlling mechanism for the conveyor of Figs. 3 and 4.

The conveyor 34 is given a step by step motion by mechanism which will now be described. A vertical shaft 90 (Fig. 1) driven by motor 24 is provided with a worm 92 meshing with a worm wheel 94 carried by a horizontal shaft 96, the latter being connected to an elongated pinion 98 by a Horton or other single revolution clutch 100. To control this clutch the machine is provided with a hand lever 102 (Figs. 1, 2 and particularly 6) fulcrumed at 103 to a bracket carried by the frame of the machine and having pivoted thereto a link 104 connected to an arm 106 of a rock shaft 108. Formed rigid with shaft 108 is a plate 110 the left hand end of which, as shown in Fig. 7, inclines upwardly. A plate 112 carried by a shaft 114 carries a bearing 116 for a shaft 118 to which are rigidly connected a bifurcated member 120 and a spring pressed finger 122.

Figure 6:
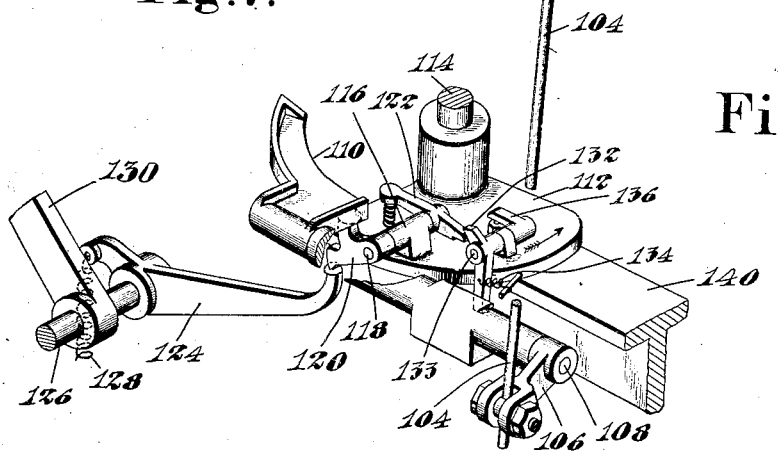

The conveyor 34 is arranged to remain at rest during the fastening inserting and trimming operations. While it is thus at rest the operative will remove a heel upon which those operations have been performed from the clamp at the feeding stations and will place a fresh heel in that clamp, utilizing the jig pins to insure the correct positioning of the fresh heel. After she has done this she will depress lever 102, thereby depressing plate 110. At this time plate 112 will be approaching or will have reached the position of Fig. 6, according to the speed of the operative. The depression of plate 110 is operative to rock member 120 in a counter clockwise direction as viewed in Fig. 6 and accordingly member 120 will rock arm 124 of rock shaft 126 against the tension of spring 128 thus rocking arm 130 (Figs. 2 and 6), which is rigid with shaft 126, out of engagement with the dog of clutch 100 and permitting that clutch to become operative to cause rotation of pinion 98. In order to avoid the necessity of holding lever 102 down for any appreciable length of time, latching mechanism is provided for holding member 120 in depressed condition after it has once been depressed by plate 110. For this purpose a finger 132 is pivoted at 133 to plate 112, this finger being normally held in the position of Fig. 6 by a spring 134. Upon the depression, however, of member 120, finger 122 is rocked past finger 132 against the action of spring 134 and takes up the position of Fig. 7. A finger 136 rigidly connected to finger 132 and co-operating with an adjustable stop 138 limits the movement of finger 132 in a counter clockwise direction as indicated in Fig. 7. After plate 112 has passed to the right from the position of Fig. 6, the depending tail of finger 132 is wiped across a stationary part of the machine such as the frame member 140 thus causing it to return to the position of Fig. 6 and permitting the elevation of member 120 under the action of the spring of finger 122. Thus it will be seen that the depression of lever 102 at any time after member 120 has reached the left hand extremity of plate 110 will be effective to cause the operation of clutch 100 even though the pressure upon the lever be instantly released. It should be understood that shaft 114 is arranged to come to rest with the plate 112 in the position of Fig. 6 unless lever 102 is depressed by the time it reaches that position, as will be more fully hereinafter explained.

A horizontal shaft 150 (Figs. 1 and 3) having bearings in the frame of the machine is provided with a pinion 152 arranged to mesh with pinion 98. A worm 154, a cam member 156 and a collar 158 are rigidly connected with pinion 152 and are slidable as a unit with that pinion longitudinally of shaft 150. A roll 159 carried by a stationary bracket (Fig. 1) co-operates with cam 156 to move that cam, worm 154, pinion 152 and collar 158 longitudinally of the shaft as those parts are rotated by pinion 98. Worm 154 meshes with a worm wheel 160 rigidly connected to conveyor shaft 32, the pitch of worm 154 and the formation of cam 156 being such that as the worm moves rearwardly its rotation and its rearward motion will exactly counteract each other so that worm wheel 160 remains stationary but while worm 154 moves forwardly it will drive worm wheel 160 in a counter clockwise direction as viewed in Fig. 3. The fastening inserting and trimming mechanisms are arranged to operate while the conveyor is thus at rest with heels in the clamps of the conveyor properly presented to those mechanisms and to remain inoperative while the conveyor is in motion. As an additional safeguard and positively to hold the conveyor in place during the fastening inserting and heel trimming operations, a bolt 161 (Fig. 2) is slidably mounted in a way formed in a bracket 162 carried by the frame of the machine. A bell crank lever 163, one of the arms of which is provided with a gear segment meshing with a rack formed upon bolt 161, is fulcrumed at 164 to bracket 162, and has a roll carried by its other arm and co-operating with a cam track 165 formed in a cam member fast upon shaft 96 and of such a form as to thrust bolt 161 into an aperture in a plate 166 secured to worm wheel 160 when the conveyor comes to rest and to withdraw it as the conveyor starts.

Mechanism which will now be described is provided to control the rocking of arms 42 and thus to control the presentation of the work to the fastening inserting and trimming devices. Mounted upon shaft 114 are a pair of cams 170, 172. Cam member 28 is rigidly connected with a rock shaft 174 having bearings in the frame of the machine and is provided with an arm 176 connected to a spring 178 tending to rock the shaft in a counter clockwise direction as viewed in Fig. 3 and with a rearwardly extending arm 180 provided with a roll held by spring 178 in contact with cam 170. Movement of cam 170 in the direction of its arrow in Fig. 3 will rock arm 28 in the direction of its arrow in Fig. 4 thus rocking the arm 42, which controls the work then at the slugging station S, in a clockwise direction as shown in Fig. 4, and rotating the heel at the slugging station in a counter clockwise direction. As the heel rotates the templet 58 is maintained in contact with roll 78 by the action of spring 40 so that the slugs are inserted in a line parallel to the desired periphery of the heel.

While one heel is being slugged another heel at the trimming station T is being trimmed. This heel is rotated by the spring 80 of its clamp 47, which spring was tensioned during the slugging of that heel in the preceding cycle of operation of the machine. As this spring rotates the heel, its templet 58 contacts with the roll 78 at the trimming station to position the heel, the rotation of the heel being controlled through the corresponding arm 42 and cam 30. As cam 28 advances to rotate the heel at the slugging station, cam 30 retracts to permit rotation in the opposite direction of the heel at the trimming station. For this purpose cam 30 is rigidly connected through rock shaft 182 to an arm 184 provided with a spring 186 anchored to the frame 20 and tending to move it in a counter clockwise direction as viewed in Fig. 3. The extremity of arm 184 is connected by a link 188 to an arm 190 of a rock shaft 192, the latter being provided with an arm 194 carrying a cam roll held by spring 186 in contact with cam 172. Thus the rotation of the heels at the slugging and trimming stations is controlled by cams 170 and 172 respectively.

Shaft 114, which carries cams 170 and 172, is provided with a gear 196 meshing with a pinion 198 sleeved on shaft 200 and operatively connected by a spring pressed tooth 202 with a ratchet disk 204 rigidly mounted upon shaft 200. Retrograde movement of pinion 198 and therefore of gear 196 is prevented by a pawl 206 co-operating with a ratchet 208 rigidly connected to gear 198. Rigidly connected to shaft 200 is an arm 210 connected by a link 212 with a lever 214 fulcrumed at 182 and having its other extremity 216 in the path of movement of the ends of arms 218 carried by and movable with the conveyor. A spring 220 rocks lever 214 into contact with an adjustable stop 222, as shown in Fig. 3, when arms 218 successively pass out of engagement with the end 216 of lever 214.

Figure 5:
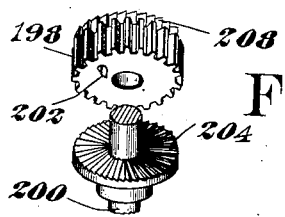
Fig. 5 is an exploded view of a ratchet drive appearing also in Fig. 3.

The machine is so geared that shaft 114, which is given an intermittent movement by mechanism hereinafter described, will rotate nearly but not quite a full revolution during the performing of each slugging and trimming operation and will then come to rest with the cams 170 and 172 a few degrees in a clockwise direction from the position in which they are shown in Fig. 3 and with the roll contacting with cam 170 upon the high portion and the roll contacting with cam 172 upon the low portion thereof. The rocking of lever 214 by the engagement of an arm 218 with its extremity operates to rotate ratchet 204 such a distance in a clockwise direction as viewed in Figs. 3 and 5 as to rotate gears 198 and 196 sufficiently to complete the rotation of shaft 114 and bring cams 170 and 172 into the position of Fig. 3. Thus cam tracks 28 and 30 are returned to the position of Fig. 3 while the rolls of levers 42 are passing over fixed cam tracks 26.

The operation of the slug inserting means and of shaft 114 is controlled in timed relation to the movement of the conveyor by mechanism which will now be described. Mounted in a sleeve 230 carried by the frame of the machine is a rod 232 (Figs. 1, 3 and 8) provided at one end with gear teeth 234 and having pivoted thereto at its other end a finger 236, the latter being fulcrumed at 238 to a pair of ears carried by the sleeve 230. The forwardly and downwardly extending extremity of finger 236 lies in the path of movement of collar 158 so that as cam 156 completes the forward movement of worm 154 and collar 158, and as the conveyor comes to rest, finger 236 will be rocked, moving rod 232 rearwardly, in the direction of its arrow in Fig. 8. A lever 240 having at its extremities gear segments meshing with teeth 234 and with a gear segment 242 rigidly carried by a rod 244 is secured to the lower end of a rod 246. Rod 244 is mounted for rotary and longitudinal movement in bearings carried by the frame of the machine and is provided at its lower end with a collar 248 rigidly secured thereto and to which is anchored a compression and torsion spring 250, the other end of which is connected to a stationary part of the machine. Spring 250 tends to raise rod 244 against an adjustable stop 252 and to rotate it in a clockwise direction as viewed in Fig. 8. Carried by the upper end of rod 244 is an arm 254 provided with a finger 256 forming part of a stop motion hereinafter to be described. Rod 246 is provided near its upper end with a rack 258 and carries also an arm 260 having its extremity arranged in co-operative relation to a cam member 262 carried by a spiral gear 264.

Motor 24 (Figs. 12 and 13) is connected through gears 270, 272, 274 with a gear 276 formed upon a clutch member 278 carried by a sleeve 280 slidably mounted upon shaft 282. A spring 284 acting through sleeve 286 tends to move clutch member 278 to the left in Fig. 12 to bring it into clutching relation with a co-operating clutch member 288 keyed or otherwise rigidly secured to shaft 282. A pair of rods 290 are slidably mounted in apertures formed in the hub of clutch member 288 and bear at one end against a flange formed upon the end of sleeve 280 and at the other against a collar 292 (Figs. 8, 10 and 12) slidably mounted upon a sleeve 294 surrounding and forming part of an elongated bearing for shaft 282. Sleeve 294 is provided with a series of gear teeth 296 engaging rack 258 of shaft 246 and is also provided in its face remote from rods 290 with a series of cavities 298 arranged to receive corresponding balls 300 carried by a co-operating collar 302 carried by sleeve 294 and held from rotation by the engagement of a lug 304 carried thereby with a stationary part of the machine illustrated at 306 in Figs. 8 and 12 as comprising a collar bearing screw threaded into the frame of the machine and thus adjustable to compensate for wear. Each cavity 298 is formed with an inclined bottom so that as collar 292 is rotated in a counter clockwise direction as viewed in Fig. 8, or a clockwise direction as viewed in Fig 10, sleeve 292 will be moved to the right as seen in those figures and in Fig. 12, compressing spring 284 and separating clutch members 278 and 288. On the other hand when collar 292 is rotated in the opposite direction, spring 284 is permitted to move clutch member 278 into engagement with clutch member 288 with a corresponding rotation of shaft 282.

Turning now to Fig. 8 it will be seen that as rod 232 rocks rod 246 in the direction of its arrow in that figure, arm 260 will be rocked sufficiently to clear cam 262 and will thereupon drop under the influence of gravity and of pressure exerted by spring 284 so that its extremity contacts with the vertical face of cam 262. As gear 264 and cam 262 rotate, arm 260 is held in this position and clutch member 278 engages clutch member 288 to drive shaft 282. As cam member 262 approaches the completion of a revolution, arm 260 passes beyond the extremity 308 of cam member 262 and is thereupon rocked in a counter clockwise direction as viewed in Fig. 8 by power stored in spring 250. At the same time shaft 244 is rocked in a clockwise direction as viewed in Fig. 8. Finger 256 is thus brought into position to engage a cam 310 rigidly connected to shaft 282 and when that cam next reaches the position indicated in Fig. 9 positively stops the rotation of the cam and of shaft 282, the clutch by this time having been disconnected by the counter clockwise rotation (as viewed in Fig. 8) of collar 292 effected by the lifting of arm 260 through the engagement of its extremity with the inclined portion 312 of cam 262 which thus comes to rest in the position indicated in Fig. 8.

Figure 1:
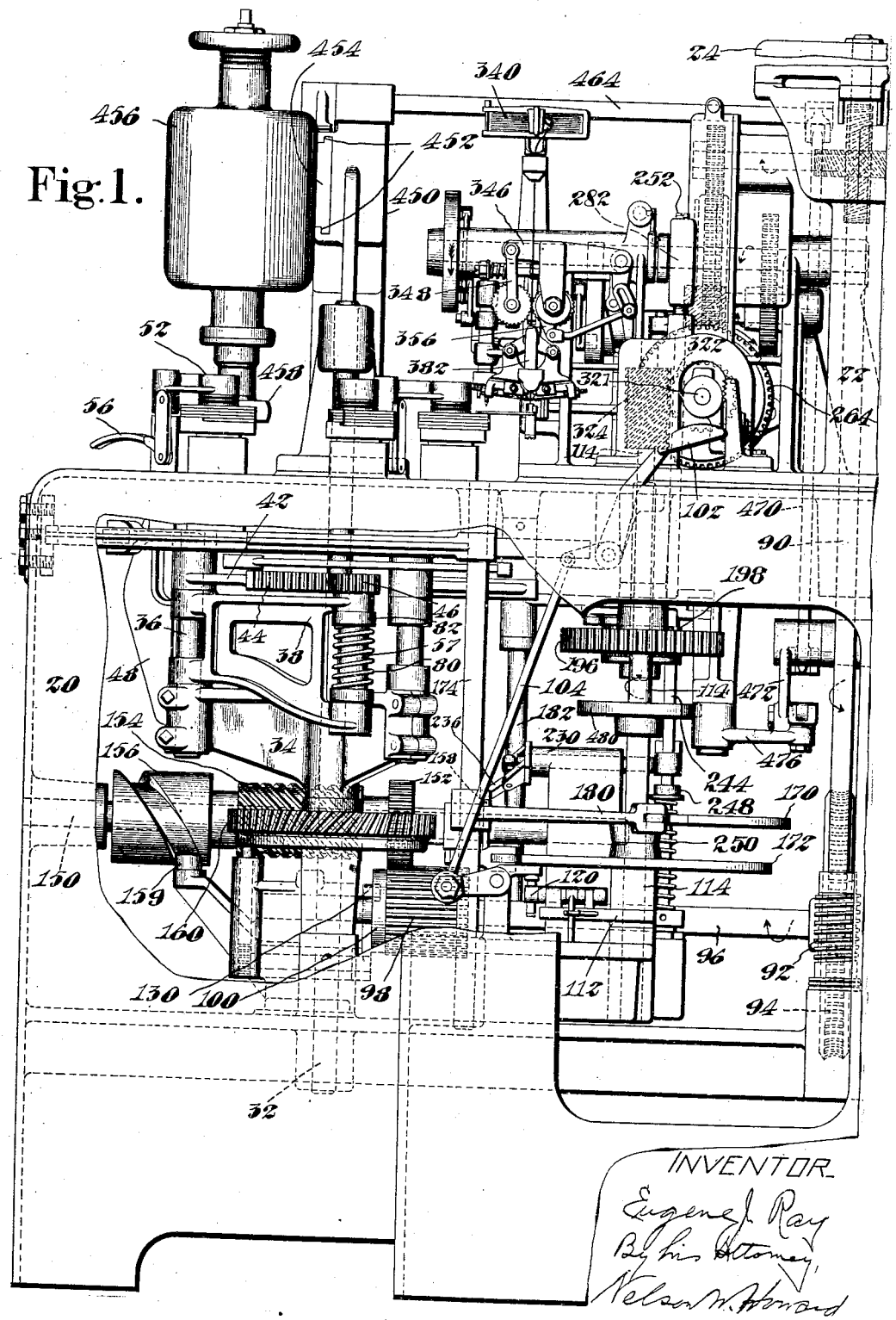
Fig. 1 is a front elevation, with part of the frame broken away, of a machine constituting a preferred embodiment of the invention.
Figure 2:
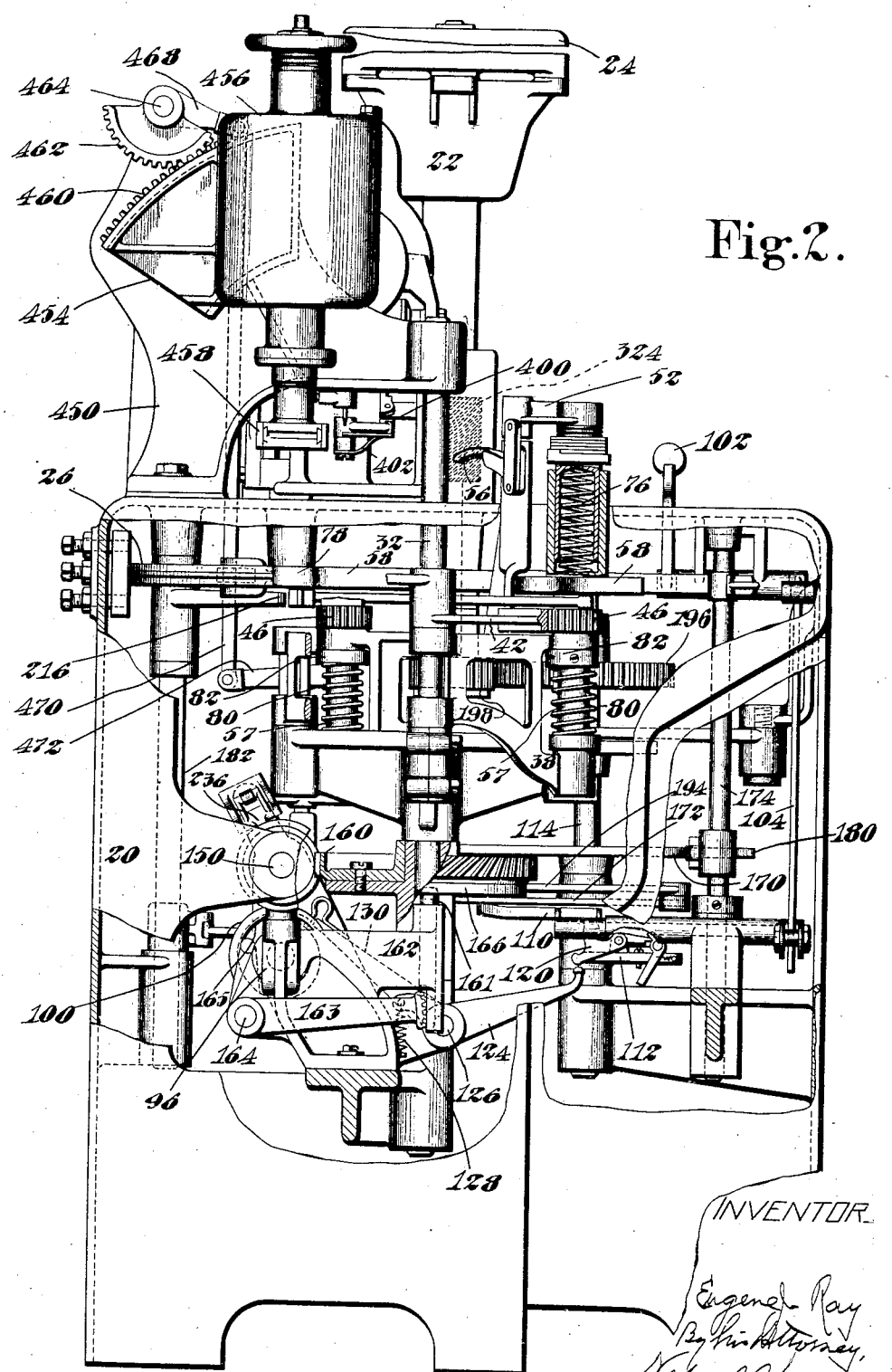
Fig. 2 is a side elevation of the machine of Fig. 1, partly in section on line 2—2 of Fig. 3, and with parts of the frame broken away.

Shaft 114 is driven from shaft 282 by a train of gearing comprising spur gears 314, 316, spiral gears 318 and 264, and skew gears 322 and 324 (Figs. 2, 12 and 13). Shaft 321, upon which are mounted gears 264 and 322 is rotated as described above and causes the machine to come to rest at the conclusion of each cycle of operation unless lever 102 is depressed shortly before the conclusion of the cycle.

The fastening forming and inserting mechanism will now be described. Wire from a reel 340 (Fig. 12) is passed between an idle roll 342 and a live roll 344 carried by a bracket 346 mounted upon the frame of the machine. Idle roll 342 is carried at the lower extremity of a link 348 adjustably urged to the right as viewed in Fig. 12 by a spring 350 restrained by a nut 352 threaded upon rod 354. Live roll 344 is provided with suitable ratchet mechanism arranged by the oscillation of arm 356 to rotate that roll in a counter clockwise direction as viewed in Figs. 12 and 16. Arm 356 is connected by a link 358 to a bell crank lever 360 having, near the extremity of one of its arms, a slot by means of which the pivotal connection of the link to the bell crank lever may be adjusted so as to adjust the extent of each step of feeding movement of roll 344. The other arm of bell crank lever 360 is provided with a roll positioned in a cam track 362 formed in a cam member mounted upon shaft 315 which carries gear 316 and worm 318. Thus during each cycle of operation of the machine the feed rolls will be operated to feed the wire a sufficient number of times to produce the desired number of slugs and will come to rest as clutch 278, 288 is rendered inoperative.

A pair of cutters 370 are adjustably carried in cutter holders 372 fulcrumed at 380 to the frame of the machine, the wire being led from the feed rolls to the cutters through a guide 382. Cutter holders 372 are connected and operated by a toggle 384, 386 the pivotal connection of the members of which is connected by a link 388 (Figs. 12 and 13) with one extremity of a bell crank lever 390 fulcrumed upon the head of the machine and carrying at its other extremity a roll operating in a cam track 392 formed in the same cam member in which is formed cam track 362. Thus the cutters are operated in timed relation to the operation of the feed rolls.

As the wire is fed past cutters 370 its extremity is received by an opening in a transfer member 400 (Figs. 12, 13 and 17) by means of which the fastenings are transferred, after they have been severed from the wire, into fastening inserting position. Transfer member 400 is fulcrumed to a bracket 402 carried by the frame of the machine and is rocked from fastening receiving to fastening inserting position by engagement of a gear segment 404 carried thereby with a gear segment 406 formed on the extremity of one arm of a three-armed lever 408 fulcrumed at 410 to bracket 402 and carrying a roll 412 operating in cam track 362. Fulcrumed at 420 to a bracket 421 fulcrumed at 423 to the frame of the machine (Figs. 13 and 17) is a bell crank lever 422 one of the arms of which is provided with a roll operating in a cam track 424 formed in a cam member carried by shaft 282. The other arm of bell crank lever 422 is made up of a pair of parallel members 426 the extremities of which are connected by a pair of links 428 to a rod 430 upon which is pivoted an awl and driver carrier 432. A yoke 434 also fulcrumed to the frame at 423 is provided with bearings 436 for the carrier 432 and is connected by a link 438 with one of the arms of lever 408. Rigidly fixed to the lower end of carrier 432 are an awl 440 and a driver 442 positioned side by side transversely of the edge of the work. An arcuate support 444 serves to prevent loss of the fastenings as they are transferred from severing to inserting position.

Figure 18:
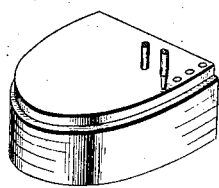
Figs. 18, 19 and 20 are diagrammatic views representing respectively a heel at the instant of penetration by the awl, a heel at the completion of a fastening inserting movement of the driver, and a partially trimmed heel.
Figure 19:
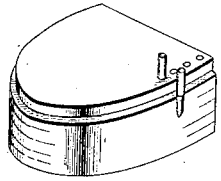
Figure 20:
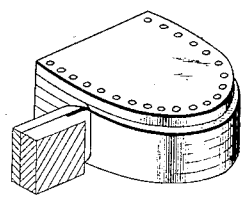

As shaft 282 rotates the awl and the driver are reciprocated and while the carrier is in elevated position it is shifted transversely of the edge of the work by means of its connection through link 438 and lever 408 with cam track 362. Cam track 424 is of such a shape that the awl and driver carrier makes two reciprocations, first to cause the awl to pierce the work and second to cause the driver to insert a fastening, for every operation of the fastening servering and transferring mechanism. The lateral shifting of the awl and driver is effective to cause the awl to clear the work and to come down in the position shown in Fig. 19 when the driver is operative to insert a fastening and the driver is of such a length as not to injure the work when the awl is operative to pierce the work as indicated in Fig. 18.

Adjacent to the trimming station T the frame of the machine carries a bracket 450 (Figs. 1, 2 and 11) provided with arcuate ways 452 arranged to receive arcuate flanges formed upon a co-operating bracket 454 carried by the casing of a motor 456. Directly connected to the rotor shaft of motor 456 is a trimming tool 458. Bracket 454 carries a gear segment 460 meshing with a segment 462 carried by a shaft 464 having bearings in bracket 450 and in another upstanding part of the frame of the machine. Rigidly connected to shaft 464 is an arm 468 connected by a link 470 to one arm of a bell crank lever 472 suitably fulcrumed to the frame of the machine and having its other arm connected by a link 474 with one arm of a similarly fulcrumed bell crank lever 476 the other arm of which carries a roll 478 co-operating with a cam 480 carried by shaft 114. Thus the rotation of shaft 114, which, it will be remembered, takes place once during each cycle of operation of the machine, is operative to rock the motor 456 and the trimming tool 458 in a manner dependent upon the form of cam 480, to vary the pitch of the different portions of the contour surface of the heel as may be desired.

In order to provide for variation in the number of slugs to be inserted the bearings of shaft 321 which carries gears 264 and 322 are arranged for vertical adjustment, as indicated in Fig. 12, so that by removing worm wheel 320 and replacing it by a worm wheel of a different size and making the necessary change in the position of shaft 321, the number of fastenings inserted will be correspondingly changed. Thus the use of a larger worm wheel 264 will slow down shaft 114 and all the parts operated or controlled by it, so that the periods of rest of the conveyor will be increased, and since the operation of the fastening inserting mechanism is unchanged, a greater number of fastenings will be inserted in each heel.

The operation of the machine will now be briefly described, starting with the parts of the machine in the position they occupy just after the completion of a slugging and trimming operation. At this time the rotation of worm 154 combined with its forward movement causes rotation of the conveyor through one-third of a revolution after which the conveyor comes to rest while worm 154 moves rearwardly. At the completion of the rearward movement of worm 154, clutch 100 is rendered inoperative by the impact of its dog upon the end of arm 130. As soon as the conveyor comes to rest the operative releases the heel clamps at the receiving station, removes the slugged and trimmed heel therefrom and replaces it with a fresh heel, placing the jig holes of the fresh heel over jig pins 70 of the clamp and swinging finger 56 downward to the position of Fig. 14 to clamp the heel in position. She then depresses lever 102. This is operative either at once or after a very short space of time to put the conveyor again into operation. While the operative is replacing the heel and worm 154 moves rearwardly, the conveyor remains at rest and clutch 278, 288 is rendered operative through the mechanism of Fig. 8 to cause the operation of shaft 282 and accordingly of the fastening inserting and heel trimming means. During the same period of time cam member 28 is rocked about its fulcrum 174 and cam member 30 is permitted to rock about its fulcrum 182 to cause rotation of the work at the trimming and slugging stations, templets 58 bearing at this time against rolls 78 to insure the correct presentation of the work. At the completion of the slugging and trimming operations the conveyor is rendered operative by reason of the forward movement of worm 154 and again moves through one-third of a revolution to shift the fresh heel to slugging position, the slugged heel to trimming position and the trimmed heel to the feeding station.

Having described my invention, what I claim as new and desire to secure by Letters Patent of the United States is:

1. A heel clamp comprising a yieldingly supported plate arranged to receive heels and provided with one or more positioning surfaces arranged positively to position a heel by co-operation with corresponding positioning surfaces formed upon the heel prior to its presentation to the clamp, thereby controlling the heel against movement in opposite directions, and a second heel engaging plate arranged to apply clamping pressure to grip the heel between the plates, said plates being mounted to permit rotary movement of the clamped heel.

2. A heel clamp comprising a plate shaped to conform to the attaching surface of a heel and provided with one or more positioning surfaces arranged to co-operate with corresponding positioning surfaces formed upon the heel to control the position of the heel, a second heel-engaging plate, and a clamping member rotatably connected to one of said plates to permit relative rotary movement of the clamping member and the clamped heel.

3. A heel clamp comprising a plate arranged to receive heels and provided with positioning surfaces arranged to co-operate with corresponding positioning surfaces formed upon a heel prior to the presentation of the heel to the clamp to control the position thereof in all directions in a plane, a spring arranged to support said plate, a second plate, and means to apply clamping pressure to grip a heel between the plates.

4. A heel clamp comprising a plate arranged to receive an unattached heel and having one or more positioning surfaces arranged to co-operate with corresponding positioning surfaces formed upon the heel to control the position thereof, toggle mechanism, and a co-operating plate connected thereto and arranged upon operation of the toggle to apply pressure to a heel thus positioned.

5. A heel clamp comprising a plate shaped to conform to the attaching surface of a heel and provided with one or more positioning surfaces arranged to co-operate with corresponding positioning surfaces formed upon the heel to control the position thereof, a clamping member co-operating therewith and constructed and arranged to permit rotary movement of said plate and a clamped heel with respect to said clamping member, and a templet connected to said plate to control the movement thereof.

6. A heel clamp comprising a plate shaped to conform to the attaching surface of a heel and provided with one or more positioning surfaces arranged to co-operate with corresponding positioning surfaces formed upon the heel to control the position thereof, a co-operating clamping member arranged to hold the heel upon the plate, and a templet connected to the plate in such manner as to permit relative yielding movement between the templet and the plate.

7. A heel clamp comprising a plate arranged to receive a heel and having one or more positioning surfaces arranged to co-operate with corresponding positioning surfaces formed upon a heel to control the heel against movement in different directions in a plane, means for clamping unattached heels to the plate, a templet connected to the plate to control the movement thereof, and means for rotating the templet, the plate and the heel clamped thereto.

8. A machine of the class described having, in combination, means for performing a plurality of different operations upon heels and a work support provided with one or more positioning surfaces arranged to co-operate with corresponding positioning surfaces formed upon portions of the heels unexposed in the finished shoes prior to the presentation of the heels to the machine to insure accurate positioning of the heels in the machine and to control the position of the heels during the performance of the operations.

9. A machine of the class described having, in combination, means for performing successively a plurality of operations upon heels and a work support provided with one or more positioning surfaces arranged to co-operate with corresponding positioning surfaces formed upon the attaching surfaces of the heels prior to the presentation of the heels to the machine to insure accurate positioning of the heels in the machine and to control the position of the heels during the performance of the successive operations.

10. A machine of the class described having, in combination, means for inserting fastenings in heels, means for trimming heels, and a work support provided with one or more positioning surfaces arranged to engage corresponding positioning surfaces formed within the margins of the heels to control the position of the heels during the insertion of the fastenings and the trimming of the heels.

11. A machine of the class described having, in combination, means for inserting fastenings in heels, and a work support arranged to feed heels step by step to the fastening inserting means and comprising a plate arranged to receive heels and having one or more positioning surfaces arranged to co-operate with corresponding positioning surfaces formed upon the heels to control the presentation of the heels to the fastening inserting means, and a co-operating plate arranged to apply pressure to heels thus positioned.

12. A machine of the class described having, in combination, means for inserting slugs in the tread surfaces of heels and a heel support provided with one or more positioning surfaces arranged to co-operate with corresponding surfaces formed within the margins of the heels to control the position of the heels during the slugging operation.

13. A machine of the class described having, in combination, means for severing fastenings from a strip of fastening material, means for inserting the severed fastenings in heels, and a heel clamp having one or more projecting positioning surfaces arranged to cooperate with corresponding positioning surfaces formed within the margins of the heels to control the position of the heels during the insertion of the fastenings, means for causing the clamp to grip the heels prior to the insertion of fastenings, and means for releasing the heels from the clamp after the conclusion of the insertion of fastenings.

14. A machine of the class described having, in combination, a tool and a heel clamp arranged to present heels thereto comprising a heel receiving plate shaped to conform to the attaching surface of a heel and provided with one or more positioning surfaces arranged to co-operate with corresponding positioning surfaces formed upon the heel to control the position of the heel during the presentation of the heel to the tool, a second heel engaging plate, and a clamping member rotatably connected to one of said plates to permit relative rotary movement of the clamping member and the clamped heel.

15. A machine of the class described having, in combination, a tool, a heel clamp having one or more positioning surfaces arranged to co-operate with corresponding positioning surfaces formed upon unattached heels to control the heels against movement in a plane in any direction during the operation of the tool, means for causing the clamp to grip the heels, means for moving the clamped heels in a path corresponding to the contour of the heels as they are operated upon, and means for thereafter releasing the heels from the clamp.

16. In a machine for inserting fastenings in shoe parts, the combination of fastening inserting means and a conveyor arranged to transfer a shoe part to and from operative relation thereto, said conveyor being provided with a plurality of groups of positioning surfaces arranged to co-operate with corresponding positioning surfaces formed within the margins of the shoe parts to control the presentation of the shoe parts to the fastening inserting means.

17. A machine of the class described having, in combination, means for operating upon heels and a conveyor arranged to transfer unattached heels to and from said means and provided with one or more positioning surfaces arranged to co-operate with corresponding positioning surfaces formed within the margin of the heels to control the presentation of the work to the operating means.

18. In a machine for operating upon shoe parts, the combination of an operating tool, a conveyor, a work support having one or more positioning surfaces arranged to co-operate with corresponding positioning surfaces formed upon the work, said work support being carried by the conveyor and mounted for movement with respect thereto, means to lock the conveyor against movement, and means for moving the work support with respect to the conveyor to bring different parts of the work successively into operative relation to said tool.

19. A machine of the class described having, in combination, means for inserting fastenings and a conveyor arranged to transfer the work to and from said means and provided with one or more positioning surfaces arranged to co-operate with corresponding positioning surfaces formed within the margin of the work to control the presentation of the work to the fastening inserting means.

20. A machine of the class described having, in combination, fastening inserting means and a conveyor arranged to present heels thereto and provided with a plurality of positioning surfaces arranged to co-operate with corresponding positioning surfaces formed in the heel seat portions of the heels to control the presentation of the heels to said means.

21. A machine of the class described having, in combination, means for severing fastenings from a strip of fastening material, means for inserting the severed fastenings in heels, a conveyor, a clamp having one or more positioning surfaces arranged to co-operate with corresponding positioning surfaces formed upon the heels to control the position thereof during the insertion of fastenings, and means for moving the clamp relatively to the conveyor to present different portions of the heels to the fastening inserting means.

22. A machine of the class described having, in combination, means for severing fastenings from a strip of fastening material, means for inserting the severed fastenings in heels, a conveyor, a plurality of clamps carried by the conveyor each provided with one or more positioning surfaces arranged to co-operate with corresponding positioning surfaces formed upon the heels to control the position of the heels, and means for moving heels carried by the clamps relatively to the conveyor to present different portions of the heels to the fastening inserting means.

23. A machine of the class described having, in combination, a tool, and a conveyor arranged to present unattached heels thereto and provided with one or more positioning surfaces arranged to co-operate with corresponding positioning surfaces formed upon the heels to control the presentation of the heels to said tool.

24. A machine of the class described having, in combination, means for inserting slugs in the tread surfaces of heels and a heel support provided with one or more jig pins arranged to enter corresponding jig holes in the heels to control the position of the heels during the slugging operation.

25. A machine of the class described having, in combination, means for performing a plurality of operations upon a heel and a work support provided with one or more jig pins arranged to enter corresponding jig holes formed in the heel prior to the performance of the first of said operations to insure correct positioning of the heel during the performance of the several operations.

26. A machine of the class described having, in combination, means for inserting fastenings in heels, means for trimming heels, and a work support provided with one or more jig pins arranged to enter corresponding jig holes in the heels to control the position of the heels during the insertion of the fastenings and the trimming of the heels.

27. A heel clamp comprising a plate arranged to receive heels and having one or more jig pins carried thereby and arranged to enter corresponding jig holes in the heels to control the position of the heels, a second heel-engaging plate, and a clamping member rotatably connected to said plate to permit relative rotary movement of the clamping member and the clamped heels.

28. A heel clamp comprising a plate arranged to receive heels and having one or more jig pins carried thereby and arranged to enter corresponding jig holes in the heels to control the position thereof, a clamping member co-operating therewith and constructed and arranged to permit rotary movement of the clamped heels, and a templet connected to said plate to control the movement thereof.

29. A machine for operating upon a heel having a heel clamp comprising a plate shaped to conform to the attaching surface of a heel and provided with one or more jig pins arranged to enter corresponding jig holes formed in the attaching surface of the heel, a second heel engaging plate arranged to engage the tread surface of the heel, and means for applying clamping pressure to the plates to grip a heel between them, said plates being mounted for rotary movement to present different portions of the heel to the operating instrumentalities of the machine.

30. A heel clamp comprising a plate arranged to receive heels and having one or more jig pins carried thereby and arranged to enter corresponding jig holes in the heels to control the position thereof, a co-operating clamping member arranged to hold heels upon the plate and to permit rotation of the heels, and a templet so connected to the plate as to permit relative yielding movement between the templet and the plate.

31. A heel clamp comprising a plate arranged to receive a heel and having one or more jig pins carried thereby and arranged to enter corresponding jig holes in the heels to control the position thereof, means for clamping heels to the plate, a templet connected to the plate to control the movement thereof, and means for rotating the templet, the plate and the heels clamped thereto.

32. A machine of the class described having, in combination, fastening inserting means including an awl and a driver and a heel clamp comprising a plate formed to receive heels and having one or more jig pins carried thereby and arranged to enter corresponding jig holes formed in the heels before they are presented to the machine to insure correct positioning of the heels in the machine, and a co-operating plate arranged to apply pressure to the heels thus positioned.

33. A machine of the class described having, in combination, a heel clamp having one or more jig pins arranged to enter corresponding jig holes formed in the heels before they are presented to said clamp to insure correct positioning of the heels in the clamp, means for causing the clamp to grip a heel, and means for inserting a group of fastenings in heels thus gripped.

34. A machine of the class described having, in combination, a tool, a heel clamp having one or more jig pins arranged to cooperate with corresponding jig holes in the heels to control the position thereof, means for operating the clamp to grip heels, and means for moving the clamped heels in a path corresponding to the contour of the heels as the heels are operated upon by the tool.

35. A machine for operating upon heels having a work support provided with a convex surface shaped to conform to the concave attaching surface of a heel, and a pair of jig pins projecting from said surface to be received in a corresponding pair of jig holes previously formed in the attaching surface of the heel to be operated upon, said convex surface of the work support being provided with a shoulder to receive the break of a heel for a shoe having a short sole.

36. In a machine of the class described, a conveyor, a pair of jig pins carried by the conveyor and arranged to enter corresponding jig holes in shoe parts carried thereby to control the position of the shoe parts, an operating tool, and means for moving said tool relatively to said pins and a shoe part positioned thereby to operate upon said shoe part.

37. A machine of the class described having, in combination, a conveyor and a heel clamp carried thereby and provided with one or more jig pins arranged to enter corresponding jig holes formed in heels to control the position of the heels upon the conveyor.

38. A machine of the class described having, in combination, means for operating upon heels, a conveyor, a clamp carried thereby and provided with one or more jig pins arranged to enter corresponding jig holes in the heels to control the position thereof, and means for moving the clamp relatively to the conveyor to present different portions of the heels to the operating means.

39. A machine of the class described having, in combination, means for operating upon heels, a conveyor, a plurality of clamps carried by the conveyor and each provided with one or more jig pins arranged to enter corresponding jig holes in the heels to control the position of the heels carried thereby, and means for moving the jig pin carrying portions of the clamps relatively to the conveyor to present different portions of the heels to the operating means.

40. A machine for operating upon shoe parts having, in combination, a work carrier movably attached to the machine, one or more jig pins carried by the carrier and arranged to enter corresponding jig holes in the work to control the position of the work on the carrier, and means to lock the carrier against movement to control the position of the work during the performance of an operation thereon.

41. A machine for operating upon shoe parts having, in combination, a conveyor, a pair of jig pins carried by said conveyor and arranged to enter corresponding jig holes in the work to control the position of the work on the conveyor, and means to lock the conveyor against movement to control the position of the work during the performance of an operation thereon.

42. A machine of the class described having, in combination, means for operating upon shoe parts, a rotary conveyor, means for rotating the conveyor step by step, one or more jig pins carried by the conveyor and arranged to enter corresponding holes in the shoe parts to control the position thereof on the conveyor, and means for holding the conveyor in predetermined relation to the operating means to control the position of the shoe parts during the operation.

43. A machine for operating upon shoe parts having, in combination, a conveyor, a work support having one or more jig pins carried by the conveyor and arranged to enter corresponding jig holes in the work, said work support being mounted for movement relatively to the conveyor, means for locking the conveyor against movement, and means for moving the work support relatively to the conveyor to bring different parts of the work successively into operative position.

44. A machine for operating upon shoe parts having, in combination, a loading station and one or more operating stations, a conveyor arranged to carry the work from the loading station to an operating station, a work-receiving member carried by the conveyor and provided with one or more jig pins arranged to enter corresponding jig holes in the work to position the work with respect to the work-receiving member, and means for moving the work-receiving member to present different parts of the work at the operating stations.

45. A machine of the class described having, in combination, a tool arranged to operate upon heels and a conveyor arranged to present heels thereto and provided with one or more jig pins arranged to enter corresponding jig holes in the heels to control the presentation of the heels to the tool.

46. A machine of the class described having, in combination, fastening inserting means and a conveyor arranged to present heels thereto and provided with one or more jig pins arranged to enter corresponding jig holes in the heels to control the presentation of the heels to the fastening inserting means.

47. A machine of the class described having, in combination, means for inserting fastenings and a conveyor arranged to transfer the work to and from said means and provided with one or more jig pins arranged to enter corresponding jig holes in the work to control the presentation of the work to the fastening inserting means.

48. A machine for operating upon heels having, in combination, a loading station and a slugging station, a conveyor arranged to carry the work from the loading station to the slugging station, a heel clamp carried by the conveyor and provided with one or more jig pins arranged to enter corresponding jig holes in heels to position the heels with respect to the heel clamp, and means for moving the heel clamp to present different parts of the heels to be slugged.

49. A machine of the class described having, in combination, a conveyor, a heel clamp carried by the conveyor arranged to grip unattached heels and to leave the contour surface thereof unencumbered, means for operating about the periphery of the unattached heels carried by the clamp, and means for moving the clamped heels relatively to the conveyor in a path corresponding to the outline thereof during the operation.

50. A machine of the class described having, in combination, a conveyor having a step by step movement, a heel clamp carried by the conveyor arranged to grip the tread and heel-seat surfaces of heels and to leave the contour surfaces unencumbered, means for operating about the periphery of a heel carried by the clamp while the conveyor is at rest, and means for moving the clamped heels in a path corresponding approximately to the outlines of the heels during the operation.

51. A machine of the class described having, in combination, a conveyor having a step by step movement, a heel clamp carried by the conveyor arranged to leave the contour surfaces of clamped heels unencumbered, means for moving heels clamped therein in a path corresponding approximately to the outlines of the heels while the conveyor is at rest, and means for moving the clamped heels in the opposite direction in a path corresponding approximately to the outlines of the heels.

52. A machine of the class described having, in combination, means for inserting a series of fastenings about the peripheries of heels, a heel clamp arranged to grip the tread and heel-seat surfaces of the heels and to leave the peripheral portions of the tread surfaces unencumbered, and means for moving the clamped heels in a path corresponding to the outline of the heels during the insertion of fastenings.

53. A machine of the class described having, in combination, a tool arranged to operate upon unattached heels, a heel clamp arranged to grip unattached heels and to leave the contour surfaces of the heels and also the portions of their tread surfaces adjacent to their contour surfaces unencumbered, and means for moving the clamped heels in a path corresponding to the outlines of the heels during the operation of the tool on the heels.

54. A machine of the class described having, in combination, means for performing a plurality of operations successively about the periphery of a heel, a heel clamp, means for moving a heel clamped therein in a path corresponding approximately to the outline of the heel during the performance of the first operation, and means for moving the clamped heel in the opposite direction in a path corresponding approximately to the outline of the heel during the performance of a subsequent operation.

55. A machine of the class described having, in combination, means for inserting fastenings about the periphery of heels, means for trimming heels, a heel clamp, and means for moving said heel clamp in a path corresponding approximately to the contour of the heels as the fastening are inserted and as the heels are trimmed.

56. A machine of the class described having, in combination, means for inserting fastenings about the periphery of heels, means for trimming heels, a heel clamp, means for moving heels clamped therein in a path corresponding to the contour of the heels as the fastenings are inserted, and means for moving the clamped heels in the opposite direction in a path corresponding to the contour of the heels as the heels are trimmed.

57. A machine for operating upon heels having, in combination, means for successively inserting a plurality of slugs adjacent to the periphery of the tread surfaces of unattached heels and means for trimming the contour surfaces of the heels substantially to their final form.

58. A machine of the class described having, in combination, means for inserting a series of fastenings in succession, trimming means, and a power-operated conveyor arranged to carry the work to said means.

59. A machine of the class described having, in combination, fastening inserting means, a rotary trimming tool and a power-operated conveyor operative to carry the work from the fastening inserting means to the trimming tool.

60. In a machine of the class described having a loading station, the combination of means for inserting a series of fastenings in succession, a rotary trimming tool, and a power-operated conveyor operative to carry the work from the loading station to present it to the fastening inserting means and to the trimming tool.

61. A machine of the class described having, in combination, a conveyor, a work support carried thereby, an arm pivoted to the conveyor and arranged by its rocking to cause rotation of the work support, and power-operated means for rocking said arm.

62. A machine of the class described having, in combination, a conveyor, a work support carried thereby, an arm pivoted to the conveyor and having gearing co-operating with gearing carried by the work support, and means for rocking the arm to cause rotary movement of the work support.

63. A machine of the class described having, in combination, a conveyor, an arm pivoted thereto, a work support rotatively carried by said arm, a second arm pivoted to the conveyor and provided with a gear segment meshing with gearing carried by the work support, and means to rock said second arm to cause rotation of the work support.

64. A machine of the class described having, in combination, a conveyor, an arm pivoted thereto, a spring tending to rock said arm, a work support rotataively carried by said arm, a second arm pivoted to the conveyor and provided with a gear segment meshing with gearing carried by the work support, and means to rock said second named arm to cause rotation of the work support.

65. A machine of the class described having, in combination, a conveyor having a step-by-step movement, a work support carried by the conveyor, and means for rotating the work support in one direction during a period of rest of the conveyor and for rotating said work support in the opposite direction during a succeeding period of rest of the conveyor.

66. A machine of the class described having, in combination, a conveyor having a step-by-step movement, a work support carried by the conveyor, means for rotating the work support in one direction during a period of rest of the conveyor and for rotating said work support in the opposite direction during a succeeding period of rest of the conveyor, and means for performing successive operations upon the work as it is thus successively rotated relatively to the conveyor.

67. A machine of the class described having, in combination, a conveyor, an arm pivoted thereto, a work support carried by said arm, a second arm pivoted to the conveyor and arranged by its movement to rotate the work support, a lever arranged at times to bear against an extremity of said second named arm, and means for rocking the lever to cause said second named arm to swing about its pivot and thus to cause rotation of the work support.

68. A machine of the class described having, in combination, a conveyor, an arm pivoted thereto, a work support carried by said arm, a second arm pivoted to the conveyor and arranged by its movement to rotate the work support, a lever arranged at times to bear against an extremity of said second named arm, and a cam arranged to rock said lever to cause said second named arm to swing about its pivot and thus to cause rotation of the work support.

69. A machine of the class described having, in combination, a conveyor, an arm pivoted thereto, a spring tending to rock said arm, a work support rotatively carried by said arm, a templet carried by said work support, a second arm pivoted to the conveyor and provided with a gear segment meshing with a gear member carried by the work support, a relatively stationary roll against which the templet is held by said spring, and means for rocking the second named arm to cause the work support to move through a path controlled by the shape of said templet.

70. A machine of the class described having, in combination, a conveyor, an arm pivoted thereto, a spring tending to rock said arm, a work support rotatively carried by said arm, a templet carried by said work support, a second arm pivoted to the conveyor and provided with gearing co-operating with a gear member carried by the work support, a relatively stationary roll against which the templet is held by said spring, and means for rocking the second named arm to cause the work support to move through a path controlled by the shape of said templet.

71. A machine of the class described having, in combination, a support shaped to receive an unattached heel, said support having one or more positioning surfaces arranged to co-operate with corresponding positioning surfaces formed upon heels within their margins prior to their presentation to the machine to insure correct positioning of the heels upon the support, and means for forming holes in the heels while thus positioned.

72. A machine of the class described having a heel support arranged to receive unattached heels and provided with one or more positioning surfaces arranged to co-operate with corresponding positioning surfaces formed within the margins of the heels prior to their presentation to the machine, and means for punching holes in the heels in predetermined relation to the positioning surfaces while the heels are thus positioned.

73. A machine of the class described, having, in combination, means for jigging heels, and means for forming holes in the heels while thus jigged.

74. A machine of the class described having, in combination, heel jigging means provided with one or more positioning surfaces arranged to co-operate with corresponding positioning surfaces formed upon the heels, means for applying pressure to the heels, and means for forming holes in the heels while thus jigged and under pressure.

75. A fastening inserting machine having, in combination, a bar, an awl and a driver rigidly carried thereby in parallel relation, and means to operate the bar to cause the awl and driver alternately to pierce the work and to drive fastenings into the openings thus formed.

76. A fastening inserting machine having, in combination, a reciprocable bar and an awl and a driver fixed to said bar in parallel relation arranged alternately to pierce and to insert fastenings in the work as the bar is reciprocated.

77. A fastening inserting machine having, in combination, a reciprocable bar, an awl and a driver rigidly attached to said bar in parallel relation, and means arranged to move the awl and driver transversely of the line of fastenings between successive reciprocations to bring the awl and driver alternately into operation.

78. A fastening inserting machine having, in combination, a reciprocable bar, an awl and a driver rigidly attached to said bar in parallel relation, and means arranged to move the awl and driver transversely of the direction of reciprocation of said bar to bring the awl and driver alternately into operation.

79. A fastening inserting machine having, in combination, a reciprocable bar, an awl and a driver rigidly secured to one end of said bar in parallel relation, and means to oscillate said bar transversely of the direction of its reciprocation to cause the awl and driver alternately to operate.

80. A fastening inserting machine having, in combination, an awl and a driver, a carrier therefor, means for shifting the carrier to bring the awl and driver alternately into operative relation to the work, and means for moving the carrier toward and from the work to cause the awl and driver respectively to pierce the work and to drive fastenings into the openings thus formed.

81. A fastening inserting machine having, in combination, an awl and driver arranged in parallel relation, a carrier therefor, means for shifting the carrier to bring the awl and driver alternately into operative relation to the work, a throat, means for supplying fastenings to the throat, and means for moving the throat into alinement with the driver prior to each operation of the latter to insert a fastening.

82. A fastening inserting machine having, in combination, an awl and driver arranged in parallel relation, a carrier therefore, means for shifting the carrier laterally of the work to bring the awl and driver alternately into operative relation to the work, means for moving the carrier toward and from the work to cause the awl and driver respectively to pierce the work and to drive fastenings into the openings thus formed, and means for feeding the work past the awl and driver to cause the insertion of a row of fastenings therein.

83. A fastening inserting machine having, in combination, an awl and a driver, a carrier to which said awl and driver are fixed in parallel relation, means for shifting the carrier laterally of the work to bring the awl and driver alternately into operative relation to the work, means for moving the carrier toward and from the work to cause the awl and driver respectively to pierce the work and to drive fastenings into the openings thus formed, a throat, means for supplying fastenings to the throat, and means for moving the throat into alinement with the driver prior to the operation of the latter to insert a fastening.

In testimony whereof I have signed my name to this specification.

EUGENE J. RAY.